United States Patent
Cao (10) Patent No.: US 8,786,638 B2
(45) Date of Patent: Jul. 22, 2014

(54) METHOD FOR PROCESSING DIGITAL IMAGE FILE AND ELECTRONIC DEVICE USING THE SAME

(75) Inventor: Ren-Ping Cao, Nanjing (CN)

(73) Assignees: Inventec Appliances (Pudong) Corporation, Shanghai (CN); Inventec Appliances Corp., New Taipei (TW); Inventec Appliances (Jiangning) Corporation, Nanjing (CN)

( * ) Notice: Subject to any disclaimer, the term of this patent is extended or adjusted under 35 U.S.C. 154(b) by 99 days.

(21) Appl. No.: 13/494,691

(22) Filed: Jun. 12, 2012

(65) Prior Publication Data
US 2012/0313972 A1    Dec. 13, 2012

(30) Foreign Application Priority Data
Jun. 13, 2011    (CN) .......................... 2011 1 0172604

(51) Int. Cl.
*G09G 5/00*        (2006.01)
*G06F 17/30*       (2006.01)

(52) U.S. Cl.
CPC .................................. *G06F 17/3028* (2013.01)
USPC ............ 345/670; 345/55; 345/660; 345/667; 382/298; 382/299; 382/300; 348/581

(58) Field of Classification Search
CPC . G06T 3/4023; G06T 3/4007; G06F 3/04835; G09G 1/16; G09G 5/227
USPC ............ 345/55, 660, 667, 670; 382/298–300; 348/581
See application file for complete search history.

(56) References Cited

U.S. PATENT DOCUMENTS

| 5,561,725 A * | 10/1996 | Degi et al. ..................... 382/299 |
| 6,252,577 B1 * | 6/2001 | Rashkovskiy et al. ........ 345/670 |
| 6,377,280 B1 * | 4/2002 | Acharya et al. ............... 345/667 |
| 7,460,136 B2 * | 12/2008 | Jeffrey et al. ................. 345/660 |
| 7,565,031 B2 * | 7/2009 | Loew ............................. 382/298 |
| 7,660,486 B2 * | 2/2010 | Chang et al. .................. 382/298 |
| 2006/0056736 A1 * | 3/2006 | Lieberman et al. ........... 382/299 |
| 2006/0203113 A1 * | 9/2006 | Wada et al. ................... 348/302 |
| 2008/0205792 A1 * | 8/2008 | Andersen ..................... 382/299 |
| 2010/0158311 A1 * | 6/2010 | Takahashi et al. ............ 382/100 |

* cited by examiner

*Primary Examiner* — Xiao Wu
*Assistant Examiner* — Todd Buttram
(74) *Attorney, Agent, or Firm* — Novak Druce Connolly Bove & Quigg LLP (57) ABSTRACT

The invention provides a method for processing a digital image in an image file and an electronic device having a function of displaying the digital image stored in the image file. The method is suitable for displaying the digital image on an electronic device including a storage unit and an image processing unit, and includes the following steps: storing a digital image file in the storage unit of the electronic device; analyzing the digital image file to obtain an image matrix of the digital image and a plurality of matrix elements of the image matrix; and generating a first size-reduced image through the image processing unit, where the first size-reduced image corresponds to a first size-reduced image matrix, which includes some of the matrix elements, said some matrix elements being not next to one another in the image matrix.

10 Claims, 6 Drawing Sheets

METHOD FOR PROCESSING DIGITAL IMAGE FILE AND ELECTRONIC DEVICE USING THE SAME

CROSS-REFERENCE TO RELATED APPLICATION

This application claims the priority benefit of China application serial no. 201110172604.0, filed on Jun. 13, 2011. The entirety of the above-mentioned patent application is hereby incorporated by reference herein and made a part of this specification.

BACKGROUND OF THE INVENTION

1. Field of the Invention

The invention relates to a method for processing a digital image in an image file and an electronic device using the same. In particular, the invention is related to a method for processing a digital image in an image file and an electronic device having a function of displaying the digital image stored in the image file.

2. Description of Related Art

With improvement of hardware technology in photosensitive components in camera devices over recent years, most digital camera devices are currently equipped with camera functions with high definitions, thereby enabling users to obtain fine digital image files.

However, when it is to completely display the fine digital image files, the users needs a display screen with a greater resolution than the fine digital image files. When the resolution of the display screen is less the resolution of a digital image file, which refers to displaying such a digital image with a greater resolution on a display screen with a smaller display size, it is required to decompress the complete digital image file, and then reduce the size of the digital image file to a smaller size, which may be suitable to the display screen.

Some digital image file formats have reduced-size image (such as thumbnail image file in a JPEG format) for display, and when the size of the reduced-size image is less than the size of the display screen, the corresponding reduced-size image may be displayed on the display screen. However, when the size of the reduced-size image is greater than the size of the display screen, the whole digital image file firstly needs to be decompressed, and a correspondingly smaller size image file may be displayed on the display screen. With development of image technology, digital image file become greater, thereby resulting in problems of wasting a lot of calculation time on displaying the digital image files.

SUMMARY OF THE INVENTION

In view of the aforementioned challenges in the conventional art, it's an objective of the invention to provide a method for processing a digital image in an image file, suitable for quickly displaying the digital image on an electronic device, and to provide an electronic device having a function of displaying the digital image stored in the image file, in order to resolve the problem that it takes longer time to decompress digital image files.

According to objectives of the invention, the invention provides a method for processing a digital image in an image file, suitable for displaying the digital image on an electronic device including a storage unit and an image processing unit. The method for processing a digital image in an image file includes: storing a digital image file in the storage unit of the electronic device; then the image processing unit analyzing the digital image file to obtain an image matrix of the digital image and a plurality of matrix elements of the image matrix; and generating a first size-reduced image through the image processing unit, wherein the first size-reduced image corresponds to a first size-reduced image matrix, which includes some of the matrix elements, said some matrix elements being not next to one another in the image matrix.

In embodiments of the invention, the digital image file may be a bitmap image file which may have a plurality of horizontal pixels and a plurality of vertical pixels.

In an embodiment of the invention, the first size-reduced image matrix includes each matrix element in both each odd-number row and each odd-number column in the image matrix.

In an embodiment of the invention, the method further includes: the image processing unit detecting a horizontal resolution and a vertical resolution of a display; and the image processing unit determining whether the number of columns of matrix elements of the image matrix is greater than the horizontal resolution, and whether the number of rows of matrix elements of the image matrix is greater than the vertical resolution; wherein if it's determined that the number of columns is greater than the horizontal resolution or the number of rows is greater than the vertical resolution, the image processing unit is configured to display the first size-reduced image on the display.

In such last embodiment, the method may further include: generating a second size-reduced image through the image processing unit, wherein the second size-reduced image corresponds to a second size-reduced image matrix, which includes some matrix elements of the first size-reduced image matrix, said some matrix elements of the first size-reduced image matrix being not next to one another in the first size-reduced image matrix.

In the last case, when the second size-reduced image matrix includes each matrix element in both each odd-number row and each odd-number column of matrix elements in the first size-reduced image matrix, the method may further include: the image processing unit determining whether the number of columns of matrix elements of the first size-reduced image matrix is greater than the horizontal resolution, and whether the number of rows of matrix elements of the first size-reduced image matrix is greater than the vertical resolution; wherein if it's determined that the number of columns of the first size-reduced image matrix is greater than the horizontal resolution or the number of rows of the first size-reduced image matrix is greater than the vertical resolution, the image processing unit is configured to display the second size-reduced image on the display.

According to objectives of the invention, the invention also provides an electronic device having a function of displaying a digital image stored in an image file. The electronic device includes a storage unit, a display, and an image processing unit. The storage unit is configured to store a digital image file. The display is configured to display a digital image, and may have a horizontal resolution and a vertical resolution. The image processing unit is electrically connected to the storage unit and the display, and is configured to analyze the digital image file to obtain an image matrix of the digital image and a plurality of matrix elements of the image matrix, wherein a first size-reduced image is to be generated through the image processing unit, and the first size-reduced image corresponds to a first size-reduced image matrix, which includes some of the matrix elements, said some matrix elements being not next to one another in the image matrix.

In embodiments of the invention, the digital image file may be a bitmap image file which may have a plurality of horizontal pixels and a plurality of vertical pixels.

In an embodiment of the invention, the first size-reduced image matrix includes each matrix element in both each odd-number row and each odd-number column in the image matrix.

In an embodiment of the invention, the image processing unit is configured to display the first size-reduced image on the display if it's determined that the number of columns of matrix elements of the image matrix is greater than the horizontal resolution or the number of rows of matrix elements of the image matrix is greater than the vertical resolution.

In such last embodiment, when the first size-reduced image matrix includes each matrix element in both each odd-number row and each odd-number column in the image matrix, a second size-reduced image may be generated through the image processing unit according to the first size-reduced image and stored in the storage unit, and the second size-reduced image may correspond to a second size-reduced image matrix, which includes some matrix elements of the first size-reduced image matrix, said some matrix elements of the first size-reduced image matrix being not next to one another in the first size-reduced image matrix.

Based upon the aforementioned, embodiments of the invention provide a method for processing a digital image in an image file and an electronic device having a function of displaying the digital image stored in the image file, and the following advantages can be obtained through using the method or the electronic device:

(1) the method for processing a digital image in an image file and the electronic device can choose to display the digital image file or a size-reduced image on the display through generating size-reduced images of larger-size images in advance, and also based on the resolution of the display and sizes of the digital image file or the size-reduced image, in order to reduce calculation time required for decompressing the digital image file; and (2) the method for processing a digital image in an image file and the electronic device can increase convenience of users through automatically selecting to display the digital image file or the size-reduced image.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
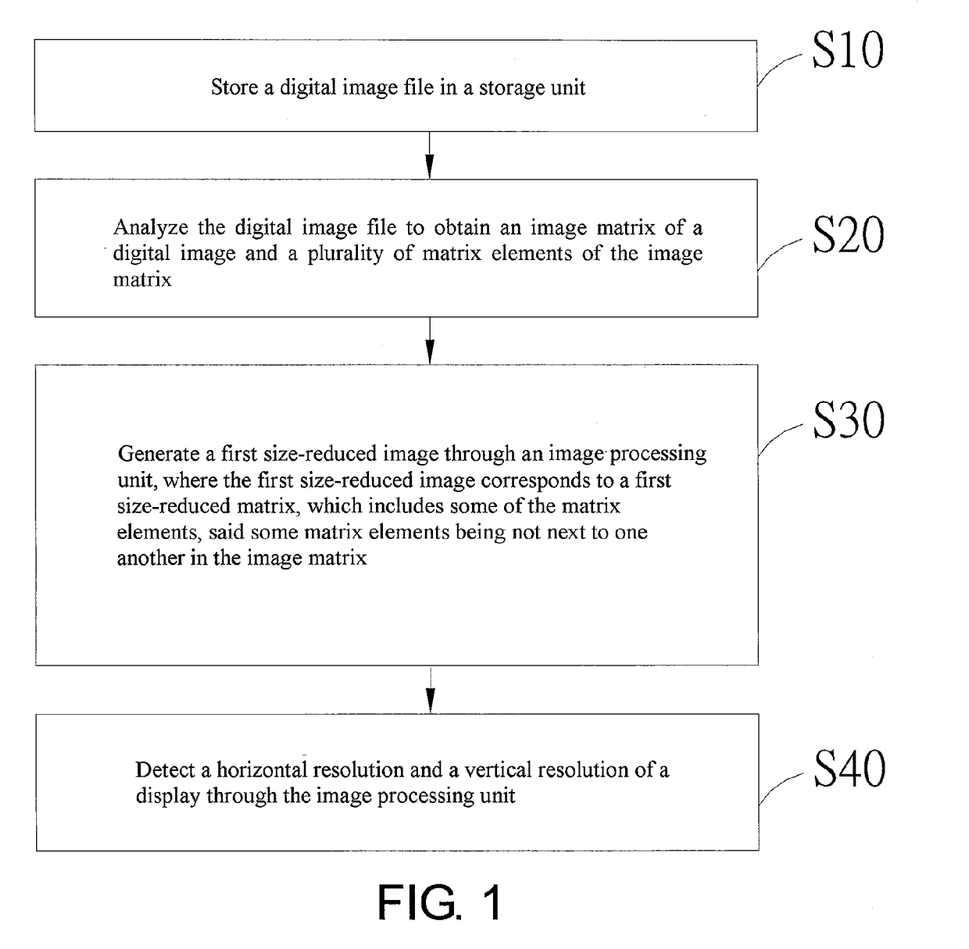
FIG. 1 is a flowchart of a method for processing a digital image in an image file according to an embodiment of the invention.

FIG. 1 is a flowchart of a method for processing a digital image in an image file according to an embodiment of the invention. Referring to FIG. 1, the method for processing a digital image in an image file is suitable for displaying the digital image on an electronic device, which includes a storage unit, a display and an image processing unit. The method for processing a digital image in an image file includes following steps.

Figure 2:
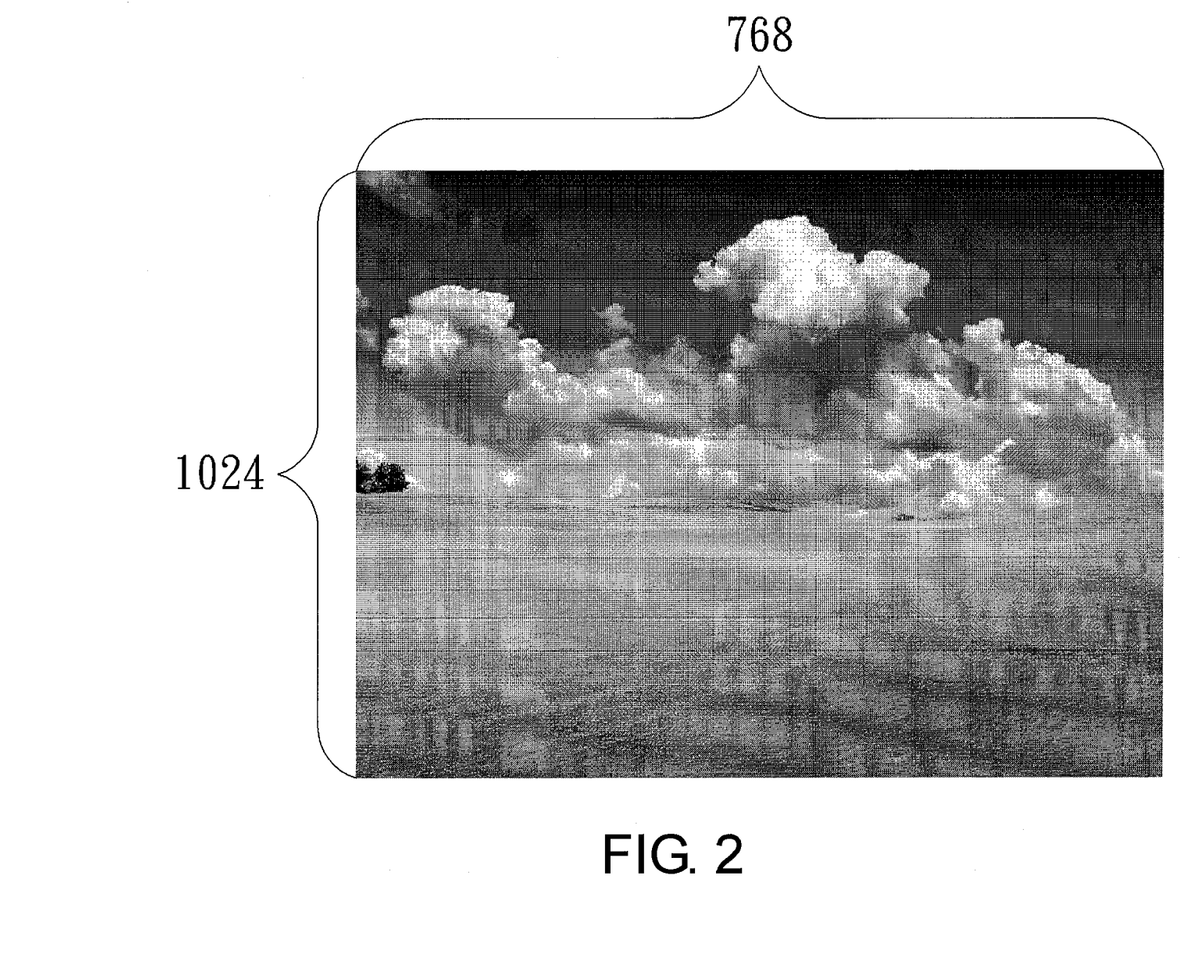
FIG. 2 is a schematic diagram of a digital image file corresponding to a flowchart of a method for processing a digital image in an image file according to an embodiment of the invention.

In step S10, it is to store a digital image file in the storage unit of the electronic device. The digital image file may be the one as shown in FIG. 2.

In step S20, the image processing unit analyzes the digital image file to obtain an image matrix of the digital image and a plurality of matrix elements of the image matrix, and then obtains the number of rows of the matrix elements of the image matrix and the number of columns of the matrix elements of the image matrix. The digital image file may be a bitmap image file, and may have a plurality of horizontal pixels and a plurality of vertical pixels. A multiplication product of the aforementioned horizontal pixels and the vertical pixels is a total number of pixels of the digital image file. Here, the image matrix may be represented by a 2n*2m matrix elements. Taking the digital image file of FIG. 2 as an example, the digital image file has 1,024×768 pixels, wherein the bitmap image file may be in JPG format or BMP format but the invention is not limited thereto.

In step S30, the image processing unit generates a first size-reduced image, wherein the first size-reduced image corresponds to a first size-reduced image matrix, which includes some of the matrix elements, said some matrix elements being not next to one another in the image matrix. Here, the image matrix may be represented by a 2n*2m matrix elements. In a preferred embodiment, the first size-reduced image matrix includes each matrix element in both each odd-number row and each odd-number column in the image matrix.

The image matrix may be represented by the following matrix.

$$\left\{ \begin{array}{l} a_{1,1}, a_{1,2}, a_{1,3}, \ldots a_{1,i}, \ldots a_{1,2n} \\ a_{2,1}, a_{2,2}, a_{2,3}, \ldots a_{2,i}, \ldots a_{2,2n} \\ a_{3,1}, a_{3,2}, a_{3,3}, \ldots a_{3,i}, \ldots a_{3,2n} \\ \ldots \\ a_{2m,1}, a_{2m,2}, a_{2m,3}, \ldots a_{2m,i}, \ldots a_{2m,2n} \end{array} \right\}$$

The first size-reduced image matrix may be represented by the following matrix.

$$\begin{Bmatrix} a_{1,1}, a_{1,3}, a_{1,5}, \ldots a_{1,2i-1}, \ldots a_{1,2n-1} \\ a_{3,1}, a_{3,3}, a_{3,5}, \ldots a_{3,2i-1}, \ldots a_{3,2n-1} \\ a_{5,1}, a_{5,3}, a_{5,5}, \ldots a_{5,2i-1}, \ldots a_{5,2n-1} \\ \ldots \\ a_{2m-1,1}, a_{2m-1,3}, a_{2m-1,5}, \ldots a_{2m-1,2i-1}, \ldots a_{2m-1,2n-1} \end{Bmatrix}$$

Further, the image processing unit may generate three size-reduce images according to each matrix element in both each odd-number row and each even-number column, each matrix element in both each even-number row and each odd-number column, and each matrix element in both each even-number row and each even-number column (respectively shown in FIG. 3) in the image matrix.

Corresponding size-reduced image matrices may be represented by following matrices.

$$\begin{Bmatrix} a_{1,2}, a_{1,4}, a_{1,6}, \ldots a_{1,2i}, \ldots a_{1,2n} \\ a_{3,2}, a_{3,4}, a_{3,6}, \ldots a_{3,2i}, \ldots a_{3,2n} \\ a_{5,2}, a_{5,4}, a_{5,6}, \ldots a_{5,2i}, \ldots a_{5,2n} \\ \ldots \\ a_{2m-1,2}, a_{2m-1,4}, a_{2m-1,6}, \ldots a_{2m-1,2i}, \ldots a_{2m-1,2n} \end{Bmatrix}$$

$$\begin{Bmatrix} a_{2,1}, a_{2,3}, a_{2,5}, \ldots a_{2,2i-1}, \ldots a_{2,2n-1} \\ a_{4,1}, a_{4,3}, a_{4,5}, \ldots a_{4,2i-1}, \ldots a_{4,2n-1} \\ a_{6,1}, a_{6,3}, a_{6,5}, \ldots a_{6,2i-1}, \ldots a_{6,2n-1} \\ \ldots \\ a_{2m,1}, a_{2m,3}, a_{2m,5}, \ldots a_{2m,2i-1}, \ldots a_{2m,2n-1} \end{Bmatrix}$$

$$\begin{Bmatrix} a_{2,2}, a_{2,4}, a_{2,6}, \ldots a_{2,2i}, \ldots a_{2,2n} \\ a_{2,4}, a_{4,4}, a_{4,6}, \ldots a_{4,2i}, \ldots a_{4,2n} \\ a_{6,2}, a_{6,4}, a_{6,6}, \ldots a_{6,2i}, \ldots a_{6,2n} \\ \ldots \\ a_{2m,2}, a_{2m,2}, a_{2m,6}, \ldots a_{2m,2i}, \ldots a_{2m,2n} \end{Bmatrix}$$

Figure 3:
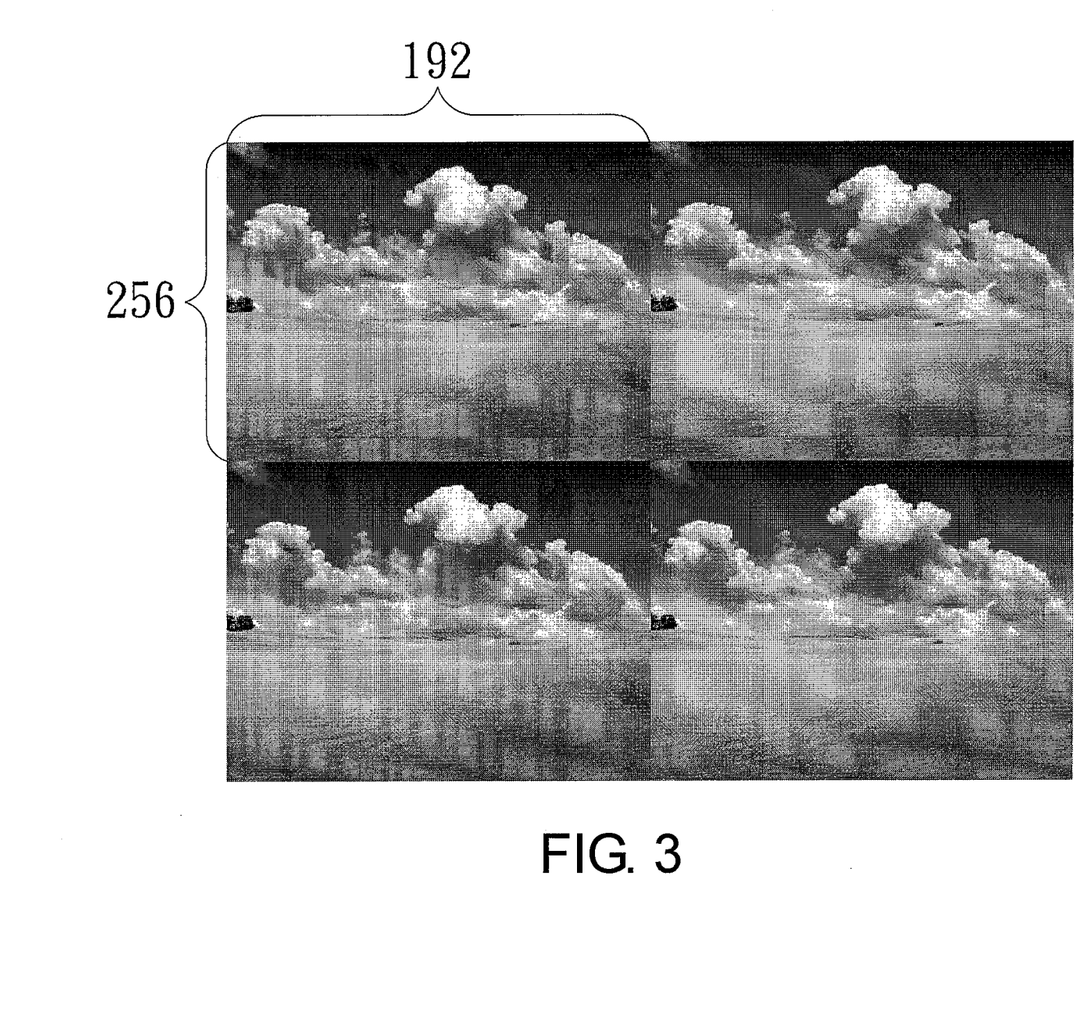
FIG. 3 is a schematic diagram of a first size-reduced image corresponding to a method for processing a digital image in an image file according to an embodiment of the invention.

However, the three size-reduced image matrices are not displayed on the display.

It is noted that although digital images corresponding to the aforementioned four size-reduced image matrices look quite the same in appearance, there are differences on actual formation thereof. Since pixels of the four size-reduced images are originally next to one another, there is no much difference between the pixels, there seems not much difference between the digital images corresponding to the aforementioned four size-reduced image matrices.

Figure 4:
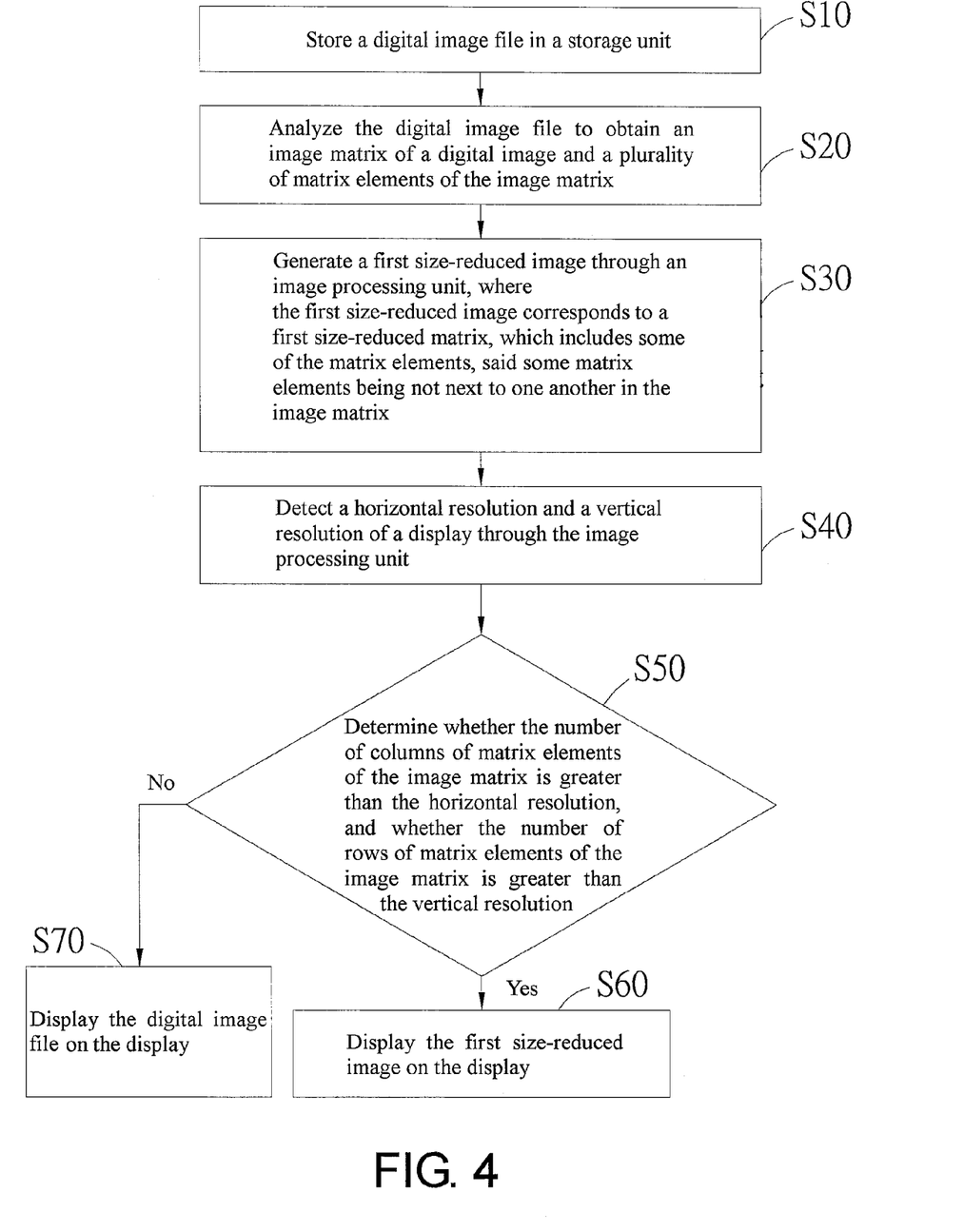
FIG. 4 is a flowchart of another method for processing a digital image in an image file according to another embodiment of the invention.

FIG. 4 is a flowchart of another method for processing a digital image in an image file according to another embodiment of the invention. Referring to FIG. 4, compared with a first embodiment shown in FIG. 1, the differences between embodiments illustrated in FIG. 1 and FIG. 4 lie in that a second embodiment (illustrated in FIG. 4) include functions of selecting adequate size-reduced images on the display according to the resolution of the display, in order to quickly display digital image files. The following description only addresses on the differences, while the remaining technical contents of the second embodiment, which are the same as the first embodiment, will not be repeated herein.

In step S40, the image processing unit detects a horizontal resolution and a vertical resolution of the display. A multiplication product of the horizontal resolution of the display and the vertical resolution of the display is usually the resolution of the display. For example, in the resolution of 800×600, "800" refers to the horizontal resolution of the display, and "600" refers to the vertical resolution of the display.

In step S50, the image processing unit determines whether the number of columns of matrix elements of the image matrix is greater than the horizontal resolution or the number of rows of matrix elements of the image matrix is greater than the vertical resolution. If it is determined that the number of columns of matrix elements of the image matrix is greater than the horizontal resolution or the number of rows of matrix elements of the image matrix is greater than the vertical resolution, step 60 is executed after the step 50. If it is determined that the number of columns of matrix elements of the image matrix is less than the horizontal resolution or the number of rows of matrix elements of the image matrix is less than the vertical resolution, step 70 is executed after the step 50.

In step S60, the image processing unit displays the first size-reduced image on the display.

In step S70, the image processing unit displays the digital image file on the display.

Figure 5:
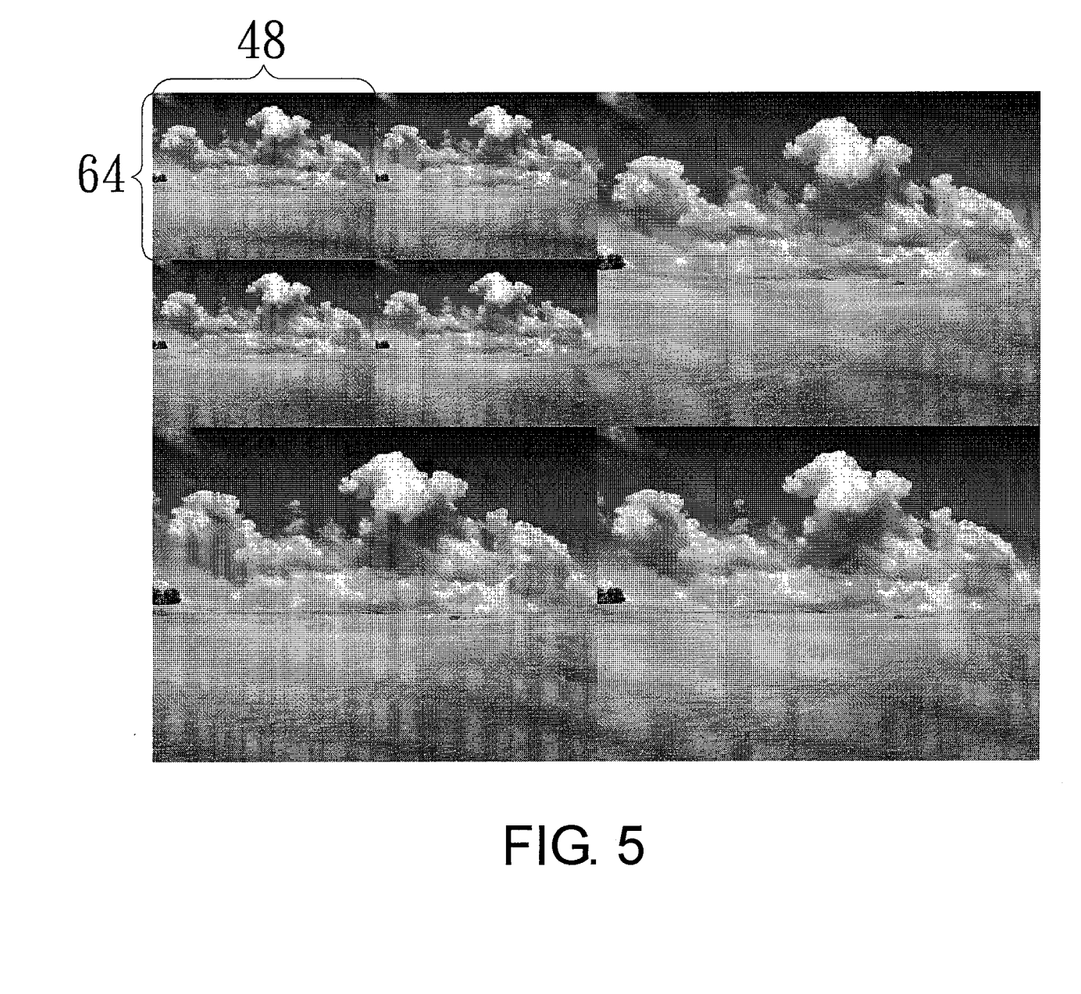
FIG. 5 is a schematic diagram of a second size-reduced image corresponding to a method for processing a digital image in an image file according to an embodiment of the invention.

It is noted that, in the step S20, the image process unit may also generate a second size-reduced image at the same time when generating the aforementioned first size-reduced image. The image process unit may store the second size-reduced image in the storage unit. The second size-reduced image corresponds to a second size-reduced image matrix, which includes some matrix elements of the first size-reduced image matrix, said some matrix elements of the first size-reduced image matrix being not next to one another in the first size-reduced image matrix. In a preferred embodiment, the second size-reduced image matrix may include each matrix element in both each odd-number row and each odd-number column in the first size-reduced image matrix. A formation principle of the second size-reduced image matrix is the same as that of the first size-reduced matrix, and the detailed description thereof is not repeated herein. The second size-reduced image is shown in FIG. 5. The image size of the second size-reduced image is a quarter of the image size of the first size-reduced image. That is, in FIG. 5, the second size-reduced image has 64×48 pixels. In FIG. 2, the digital image has 1024×768 pixels. In FIG. 3, the first size-reduced image has 256×192 pixels.

The image processing unit may also determine whether the number of columns of matrix elements of the first size-reduced image matrix is greater than the horizontal resolution, and whether the number of rows of matrix elements of the first size-reduced image matrix is greater than the vertical resolution. If it's determined that the number of columns of the first size-reduced image matrix is greater than the horizontal resolution or the number of rows of the first size-reduced image matrix is greater than the vertical resolution, the image processing unit is configured to display the second size-reduced image on the display.

Based upon the aforementioned technical disclosure, the image processing unit can generate a series of size-reduced images corresponding to the digital image in advance, and choose to display the digital image file or one of the size-reduced images on the display based on the resolution of the display and size of each of the size-reduced images. In order to taking care of image display quality and user convenience, the image processing unit can choose to display a size-reduced image of a largest display size among the size-reduced images whose display sizes less than the resolution of the display.

Further, when the electronic device is externally connected to an external display with a larger size, the image processing unit may restore the aforementioned size-reduced image and the further-size-reduced image back to the original digital image file. Thereby, the digital image file may be restored without damaging the display quality, and the additional calculation time may also be within a reasonable and acceptable range.

Through the aforementioned steps, in the present embodiment, the main principle of the method for processing a digital image in an image file may convert the original image matrix of 2n*2m back to four size-reduced image matrices of n*m, and each size-reduced image matrix has a corresponding image size of a quarter of the size of the digital image before size reduction.

The aforementioned image matrices may be represented by following mathematical expressions.

$$A = \begin{Bmatrix} a_{1,1}, a_{1,2}, a_{1,3}, \ldots a_{1,i}, \ldots a_{1,2n} \\ a_{2,1}, a_{2,2}, a_{2,3}, \ldots a_{2,i}, \ldots a_{2,2n} \\ a_{3,1}, a_{3,2}, a_{3,3}, \ldots a_{3,i}, \ldots a_{3,2n} \\ \ldots \\ a_{2m,1}, a_{2m,2}, a_{2m,3}, \ldots a_{2m,i}, \ldots a_{2m,2n} \end{Bmatrix},$$

which may be transformed into $$\begin{Bmatrix} A_{11}, A_{12} \\ A_{21}, A_{22} \end{Bmatrix}.$$

$$A_{11} = \begin{Bmatrix} a_{1,1}, a_{1,3}, a_{1,5}, \ldots a_{1,2i-1}, \ldots a_{1,2n-1} \\ a_{3,1}, a_{3,3}, a_{3,5}, \ldots a_{3,2i-1}, \ldots a_{3,2n-1} \\ a_{5,1}, a_{5,3}, a_{5,5}, \ldots a_{5,2i-1}, \ldots a_{5,2n-1} \\ \ldots \\ a_{2m-1,1}, a_{2m-1,3}, a_{2m-1,5}, \ldots a_{2m-1,2i-1}, \ldots a_{2m-1,2n-1} \end{Bmatrix};$$

$$A_{12} = \begin{Bmatrix} a_{1,2}, a_{1,4}, a_{1,6}, \ldots a_{1,2i}, \ldots a_{1,2n} \\ a_{3,2}, a_{3,4}, a_{3,6}, \ldots a_{3,2i}, \ldots a_{3,2n} \\ a_{5,2}, a_{5,4}, a_{5,6}, \ldots a_{5,2i}, \ldots a_{5,2n} \\ \ldots \\ a_{2m-1,2}, a_{2m-1,4}, a_{2m-1,6}, \ldots a_{2m-1,2i}, \ldots a_{2m-1,2n} \end{Bmatrix};$$

$$A_{21} = \begin{Bmatrix} a_{2,1}, a_{2,3}, a_{2,5}, \ldots a_{2,2i-1}, \ldots a_{2,2n-1} \\ a_{4,1}, a_{4,3}, a_{4,5}, \ldots a_{4,2i-1}, \ldots a_{4,2n-1} \\ a_{6,1}, a_{6,3}, a_{6,5}, \ldots a_{6,2i-1}, \ldots a_{6,2n-1} \\ \ldots \\ a_{2m,1}, a_{2m,3}, a_{2m,5}, \ldots a_{2m,2i-1}, \ldots a_{2m,2n-1} \end{Bmatrix};$$

$$A_{22} = \begin{Bmatrix} a_{2,2}, a_{2,4}, a_{2,6}, \ldots a_{2,2i}, \ldots a_{2,2n} \\ a_{2,4}, a_{4,4}, a_{4,6}, \ldots a_{4,2i}, \ldots a_{4,2n} \\ a_{6,2}, a_{6,4}, a_{6,6}, \ldots a_{6,2i}, \ldots a_{6,2n} \\ \ldots \\ a_{2m,2}, a_{2m,2}, a_{2m,6}, \ldots a_{2m,2i}, \ldots a_{2m,2n} \end{Bmatrix}.$$

In previously illustrated mathematical expressions, A is the image matrix, and A11, A12, A21 and A22 are the size-reduced image matrices.

Apparently, the method for processing a digital image in an image file of the present embodiment is reversible according to the previously illustrated mathematical expressions. That is, the four size-reduced matrices A11, A12, A21 and A22 may be restored back to the original image matrix A.

Although the present embodiment is implemented with a size reduction to a quarter of the original matrix dimension, the method for processing a digital image in an image file may also be implemented by another size reduction to a ⅑ of the original matrix dimension. The implementation principle of the size reduction to a ⅑ of the original matrix dimension may be similar to the size reduction to a ¼ of the original matrix dimension, and the detailed technical content thereof is not repeated herein.

Figure 6:
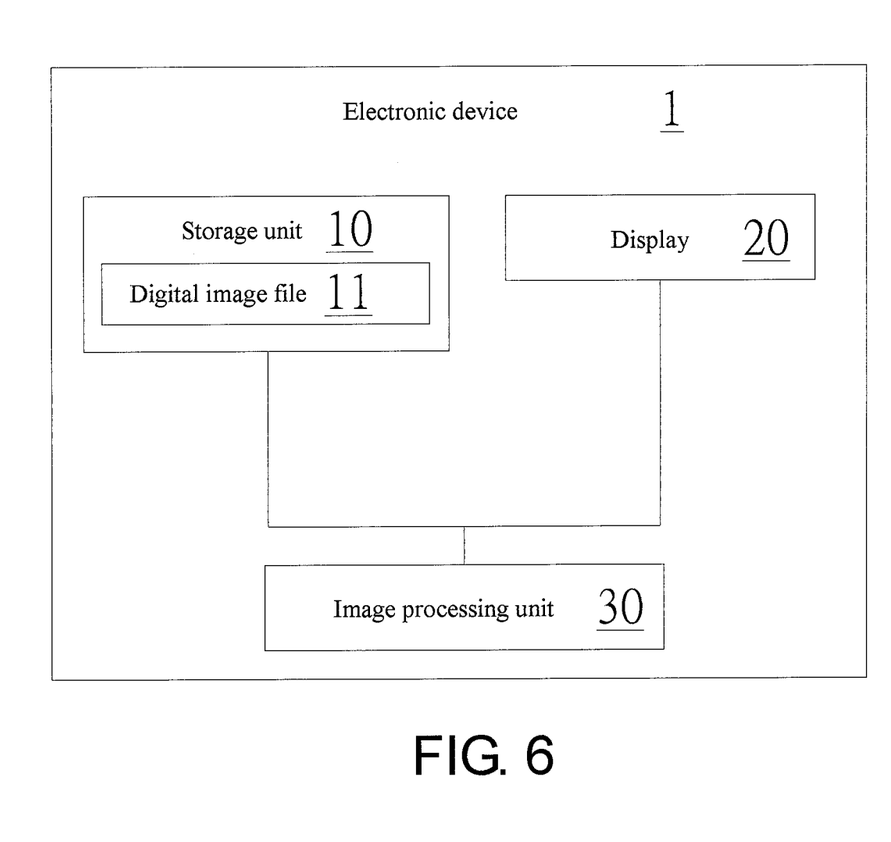
FIG. 6 is a functional block diagram of an electronic device having a function of displaying a digital image stored in an image file according to an embodiment of the invention.

FIG. 6 is a functional block diagram of an electronic device having a function of displaying a digital image stored in an image file according to an embodiment of the invention. Referring to FIG. 6, an electronic device 1 includes a storage unit 10, a display 20 and an image processing unit 30. The storage unit 10 may store a digital image file 11. The display 20 has a horizontal resolution and a vertical resolution. The image processing unit 30 is electrically connected to the storage unit 10 and the display 20.

The image processing unit 30 may analyze the digital image file 11 to obtain an image matrix of the digital image (corresponding to the digital image file 11) and a plurality of matrix elements of the image matrix. The image processing unit 30 may generate a first size-reduced image 12 according to the image matrix. The first size-reduced image 12 corresponds to a first size-reduced image matrix, which includes some of the matrix elements, said some matrix elements being not next to one another in the image matrix. Here, the image matrix may be represented by a 2n*2m matrix elements. The image processing unit 30 may obtain each matrix element in both each odd-number row and each odd-number column in the image matrix, in order to generate the first size-reduced image 12.

The image processing unit 30 may also determine whether the number of columns of matrix elements of the image matrix is greater than the horizontal resolution, and whether the number of rows of matrix elements of the image matrix is greater than the vertical resolution. If it's determined that the number of columns is greater than the horizontal resolution or the number of rows is greater than the vertical resolution, the image processing unit 30 may display the first size-reduced image 12 on the display 20. Otherwise, the image processing unit 30 may display the digital image file 11 on the display 20.

The digital image file 11 may be a bitmap image file, and may have a plurality of horizontal pixels and a plurality of vertical pixels. A multiplication product of the aforementioned horizontal pixels and the vertical pixels is a total number of pixels of the digital image file 11. The bitmap image file may be in JPG format or BMP format but the invention is not limited thereto.

In addition, the image processing unit 30 may generate a first size-reduced image 12. The image processing unit 30 may also generate a second size-reduced image 13 according to the first size-reduced image 12. The second size-reduced image 13 corresponds to a second size-reduced image matrix, which includes some matrix elements of the first size-reduced image matrix, said some matrix elements of the first size-reduced image matrix being not next to one another in the first size-reduced image matrix. In a preferred embodiment, the second size-reduced image matrix includes each matrix element in both each odd-number row and each odd-number column in the first size-reduced image matrix.

After the image processing unit 30 determines whether the number of columns of matrix elements of the image matrix is greater than the horizontal resolution, and whether the number of rows of matrix elements of the image matrix is greater than the vertical resolution, the image processing unit 30 may further determine whether the number of columns of matrix elements of the first size-reduced image matrix is greater than the horizontal resolution, and whether the number of rows of matrix elements of the first size-reduced image matrix is greater than the vertical resolution. If it's determined that the number of columns of the first size-reduced image matrix is greater than the horizontal resolution or the number of rows of the first size-reduced image matrix is greater than the vertical resolution, the image processing unit 30 may display the second size-reduced image 13 on the display 20. Otherwise, the image processing unit 30 may display the first size-reduced image 12 on the display 20.

As such, size-reduced images may be thereby generated through the size reduction to a quarter of the original size each time.

It will be apparent to those skilled in the art that various modifications and variations may be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for processing a digital image in an image file, suitable for displaying the digital image on an electronic device including a storage unit and an image processing unit, the method for processing the digital image comprising the following steps:

storing a digital image file in the storage unit of the electronic device;

the image processing unit analyzing the digital image file to obtain an image matrix of the digital image and a plurality of matrix elements of the image matrix;

generating a first size-reduced image through the image processing unit, wherein the first size-reduced image corresponds to a first size-reduced image matrix, which includes some of the matrix elements, said some matrix elements being not next to one another in the image matrix;

the image processing unit detecting a horizontal resolution and a vertical resolution of a display; and the image processing unit determining whether the number of columns of matrix elements of the image matrix is greater than the horizontal resolution, and whether the number of rows of matrix elements of the image matrix is greater than the vertical resolution;

wherein if it's determined that the number of columns is greater than the horizontal resolution or the number of rows is greater than the vertical resolution, the image processing unit is configured to display the first size-reduced image on the display.

2. The method for processing a digital image in claim 1, wherein the first size-reduced image matrix includes each matrix element in both each odd-number row and each odd-number column in the image matrix.

3. The method for processing a digital image in claim 1, further comprising:

generating a second size-reduced image through the image processing unit, wherein the second size-reduced image corresponds to a second size-reduced image matrix, which includes some matrix elements of the first size-reduced image matrix, said some matrix elements of the first size-reduced image matrix being not next to one another in the first size-reduced image matrix.

4. The method for processing a digital image in claim 3, wherein the second size-reduced image matrix includes each matrix element in both each odd-number row and each odd-number column of matrix elements in the first size-reduced image matrix.

5. The method for processing a digital image in claim 4, further comprising:

the image processing unit determining whether the number of columns of matrix elements of the first size-reduced image matrix is greater than the horizontal resolution, and whether the number of rows of matrix elements of the first size-reduced image matrix is greater than the vertical resolution; and wherein if it's determined that the number of columns of the first size-reduced image matrix is greater than the horizontal resolution or the number of rows of the first size-reduced image matrix is greater than the vertical resolution, the image processing unit is configured to display the second size-reduced image on the display.

6. An electronic device having a function of displaying a digital image stored in an image file, the electronic device comprising:

a storage unit, configured to store a digital image file;

a display, configured to display a digital image; and an image processing unit, electrically connected to the storage unit and the display, configured to analyze the digital image file to obtain an image matrix of the digital image and a plurality of matrix elements of the image matrix, wherein a first size-reduced image is to be generated through the image processing unit, and the first size-reduced image corresponds to a first size-reduced image matrix, which includes some of the matrix elements, said some matrix elements being not next to one another in the image matrix, wherein the display has a horizontal resolution and a vertical resolution; and the image processing unit is configured to display the first size-reduced image on the display if it's determined that the number of columns of matrix elements of the image matrix is greater than the horizontal resolution or the number of rows of matrix elements of the image matrix is greater than the vertical resolution.

7. The electronic device in claim 5, wherein the first size-reduced image matrix includes each matrix element in both each odd-number row and each odd-number column in the image matrix.

8. The electronic device in claim 5, wherein a second size-reduced image is to be generated through the image processing unit according to the first size-reduced image and stored in the storage unit, the second size-reduced image corresponds to a second size-reduced image matrix, which includes some matrix elements of the first size-reduced image matrix, said some matrix elements of the first size-reduced image matrix being not next to one another in the first size-reduced image matrix.

9. The electronic device in claim 8, wherein the second size-reduced image matrix includes each matrix element in both each odd-number row and each odd-number column of matrix elements in the first size-reduced image matrix.

10. The electronic device in claim 9, wherein the image processing unit is configured to determine whether the number of columns of matrix elements of the first size-reduced image matrix is greater than the horizontal resolution, and whether the number of rows of matrix elements of the first size-reduced image matrix is greater than the vertical resolution, and if it's determined that the number of columns of the first size-reduced image matrix is greater than the horizontal resolution or the number of rows of the first size-reduced image matrix is greater than the vertical resolution, the image processing unit is configured to display the second size-reduced image on the display.

* * * * *